United States Patent [19]

Giles et al.

[11] 4,374,769
[45] Feb. 22, 1983

[54] WATER-SOLUBLE TRIS PHENYL BISAZO DYES FOR POLYAMIDE FIBERS

[75] Inventors: Ralph R. Giles; Max A. Weaver, both of Kingsport, Tenn.

[73] Assignee: Eastman Kodak Company, Rochester, N.Y.

[21] Appl. No.: 274,599

[22] Filed: Jun. 17, 1981

[51] Int. Cl.³ .................. C09B 29/26; C09B 29/085; C09B 31/062; D06P 3/24
[52] U.S. Cl. .................. 260/187; 260/178; 260/184; 260/207; 260/207.1; 260/207.3
[58] Field of Search .................. 260/187, 178, 184

[56] References Cited

U.S. PATENT DOCUMENTS

| | | | |
|---|---|---|---|
| 2,265,425 | 12/1941 | Fischer et al. | 260/187 |
| 2,670,265 | 2/1954 | Heyna et al. | 260/152 X |
| 2,720,518 | 10/1955 | Buehler | 260/199 |
| 2,773,863 | 12/1956 | Bolliger | 260/162 |
| 2,790,172 | 4/1957 | Rudner | 260/158 X |
| 3,114,754 | 12/1963 | Lodge et al. | 260/158 X |
| 3,232,927 | 2/1966 | Randall et al. | 260/163 |
| 3,531,459 | 9/1970 | Chiddix et al. | 260/163 |
| 3,957,751 | 5/1976 | Bauer et al. | 260/193 |
| 3,998,805 | 12/1976 | Koller et al. | 260/207 |
| 4,036,824 | 7/1977 | Moritz et al. | 260/186 |
| 4,119,623 | 10/1978 | Hugl et al. | 260/206 |
| 4,301,068 | 11/1981 | Giles et al. | 260/152 |

*Primary Examiner*—Floyd D. Higel
*Attorney, Agent, or Firm*—Donald W. Spurrell; Daniel B. Reece, III

[57] ABSTRACT

Disclosed are tris phenyl bisazo dyes bearing one or two sulfated alkoxycarbonyl or sulfated alkylcarbamyl groups. These dyes impart yellow to red shades to fibers, particularly polyamides, and are especially useful for dyeing polyamide (nylon) carpets, generally giving good fastness to light, ozone, oxides of nitrogen, washing, sublimation, crocking, and the like, and having good leveling, exhaustion, build properties, and stability to variations in dyeing condition such as pH and temperature.

The present dyes have the general formula:

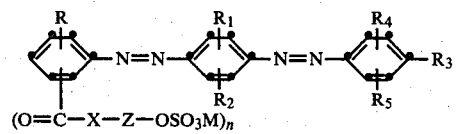

wherein X is —O—, —NH—, —N(alkyl)—, or —N-(aryl)—; Z is selected from straight or branched-chain alkylene, and such alkylene containing one or two internal linkages independently selected from ether, amine and amide; M is H, Na, K, or $NH_4$; n is 1 or 2; $R_3$ is —OH, alkoxy or —$NR_8R_9$, wherein $R_8$ and $R_9$ are independently selected from H and alkyl and when either $R_4$ or $R_5$ is hydroxy or alkoxy ortho to the azo radical, $R_3$ is further selected from hydrogen, halogen, alkyl, aryl and acylamido; and R, $R_1$, $R_2$, $R_4$, and $R_5$ are independently selected from hydrogen, halogen, hydroxyl, alkyl, aryl, alkoxy, and acylamido, with the proviso that when $R_3$ is neither —OH, alkoxy, nor —$NR_8R_9$, one of $R_4$ and $R_5$ is either hydroxy or alkoxy ortho to the azo radical. These alkyl, alkylene, alkoxy and aryl moieties may be substituted with a wide variety of substituents known to the art.

6 Claims, No Drawings

WATER-SOLUBLE TRIS PHENYL BISAZO DYES FOR POLYAMIDE FIBERS

Disclosed are bisazo dyes bearing one or two sulfated alkoxycarbonyl or sulfated alkylcarbamyl groups. These dyes are water-soluble exhibiting excellent dyeing properties on polyamide fibers and also are useful for dyeing cellulose acetate and wool. The dyes have the general formula:

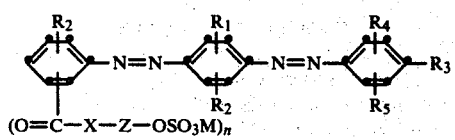

wherein X is —O—, —NH—, —N(alkyl)—, or —N-(aryl)—; Z is selected from straight or branched-chain alkylene, and such alkylene containing one or two internal linkages independently selected from ether, amine and amide; M is H, Na, K, or $NH_4$; n is 1 or 2; $R_3$ is —OH, alkoxy or —$NR_8R_9$ wherein $R_8$ and $R_9$ are independently selected from H and alkyl and when either $R_4$ or $R_5$ is hydroxy or alkoxy ortho to the azo radical, $R_3$ is further selected from hydrogen, halogen, alkyl, aryl and acylamido; and R, $R_1$, $R_2$, $R_4$, and $R_5$ are the same or different groups selected from hydrogen, halogen, hydroxyl, alkyl, aryl, alkoxy, and acylamido, with the proviso that when $R_3$ is neither —OH, alkoxy, nor —$NR_8R_9$, one of $R_4$ and $R_5$ is either hydroxy or alkoxy ortho to the azo radical. These alkyl, alkylene, alkoxy and aryl moieties may be substituted with one to three substituents selected from hydroxy, halogen, cyano, succinimido, cyclohexyl, alkylsulfonyl, alkylthio, alkanoyl, alkanoyloxy, amino, alkylamino, dialkyl-amino, arylamino, furyl, alkoxy, phenoxy, alkanoylamino, sulfamoyl, alkylsulfamoyl, dialkylsulfamoyl, phenyl and phenyl substituted with alkyl, alkoxy, halogen, alkanoyl-amino, cyano or alkoxycarbonyl, —$COOR^6$ wherein $R^6$ is selected from alkyl and alkyl substituted with halogen, hydroxy, phenoxy, aryl, cyano, cycloalkyl, alkylsulfonyl, alkylthio, alkanoyloxy or alkoxy, and $OCOR^7$ wherein $R^7$ is alkyl. All of the above alkyl, alkylene, alkoxy and aryl moieties contain from one to six carbons.

These dyes impart yellow to red shades to fibers, particularly polyamides, and are especially useful for dyeing polyamide (nylon) carpets, generally giving good fastness to light, ozone, oxides of nitrogen, washing, sublimation, crocking, and the like, and having good leveling, exhaustion, build properties, and stability to variations in dyeing condition such as pH and temperature.

The dyes bearing sulfated alkylcarbamyl groups may be prepared by reacting a diazotizable coupler (B—$NH_2$) with the diazonium salt of a benzene compound (ring A) which contains one or two carbalkoxy groups. The resulting monoazo dye A—N=N—B—$NH_2$ is diazotized and coupled with an ortho or para-coupling moiety such as a phenol (C—OH). The phenolic group on ring C may be treated subsequently, for example, with an alkyl halide or dialkyl sulfate to alkylate the phenolic group of ring C. Anytime after the first coupling reaction, the carbalkoxy group of ring A can be reacted with an amino alcohol $H_2N$—Z—OH (Z is alkylene) to convert it to a N-(hydroxyalkyl)carbamyl group and then with concentrated sulfuric acid to sulfate the hydroxyl group. An exemplary sequence of these reactions is illustrated as follows:

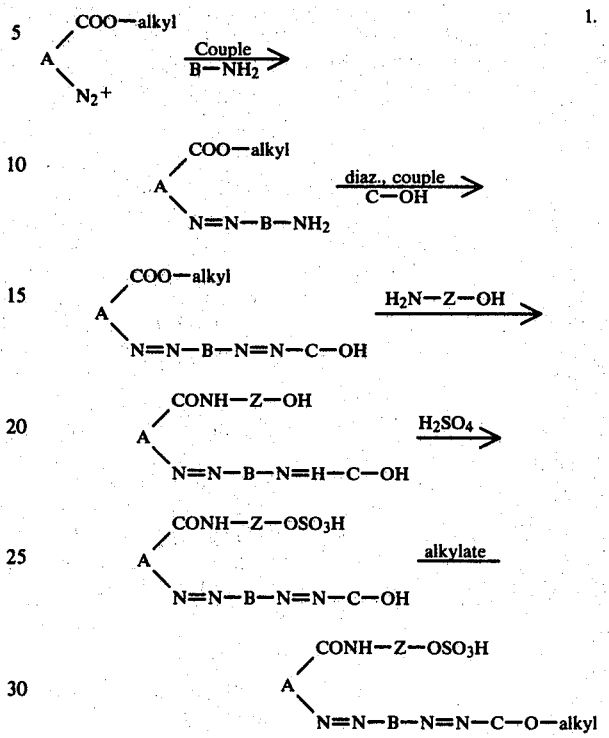

The dyes bearing sulfated alkoxycarbonyl groups (COO—Z—$OSO_3H$) are prepared, for example, from an aniline compound (A—$NH_2$) containing one or two hydroxyalkoxy carbonyl groups. As above, the aniline compound is diazotized, coupled with B—$NH_2$, diazotized again, then coupled with C—OH and, if desired, alkylated on the phenolic group of the third ring. Reaction with concentrated sulfuric acid to form the sulfate of the hydroxyalkoxy carbonyl group may be performed either before the first diazotization or at any time thereafter. The dyes are customarily isolated in the form of the alkali salt.

This invention will be further illustrated by the following examples which are included merely for purposes of illustration and are not intended to limit the scope of the invention.

EXAMPLE 1

Methyl anthranilate (30.23 g) is diazotized at 0°–2° C. by dissolving it in dilute hydrochloric acid (60 ml of 37% HCl in 200 ml of water) and adding sufficient sodium nitrite solution (14.4 g of $NaNO_2$ in 40 ml of water) to the anthranilate solution over a period of 45–50 minutes. The diazotized material preferably is allowed to stand at about 2° C. for one-half hour longer before being used.

Approximately one fifth of a mole of 2-methoxy-5-methylaniline is dissolved in a solution of 700 ml of 1:5 acid (1:5 ratio by volume of propionic/acetic) and 150 ml of 15% sulfuric acid, the solution cooled to 0° C. and held at 0°–3° C. while the diazonium solution is added thereto. About 70 g of sodium acetate is also added in portions to make the material neutral to Congo Red.

After an additional hour at about 2° C., 500 ml of concentrated ammonium hydroxide (28% $NH_3$) is added at such a rate that the temperature does not exceed 25° C. As the pH increases toward neutral, the product appears as an oil, then as crystals or pellets which are removed by filtration, washed with water and recrystallized from dilute methanol. The yellow product is 4-[(2-carbomethoxyphenyl)azo]-2-methoxy-5methyl aniline having a λ max. in acetone at 419 nm.

EXAMPLE 2

9.46 Grams of the product of Example 1 is dissolved in a solution of 3 ml of concentrated hydrochloric acid and 9 ml of acetic acid in 34 ml of water. A solution of 6 ml of concentrated hydrochloric acid in 60 g of ice and water is added first, followed by a solution of 2.16 g of sodium nitrite in 7 ml of water, all within several minutes. The temperature rises to about 15° C. and then to about 20° C. after a further 2.5 hours at room temperature.

A coupler solution consisting of 2.82 g of phenol dissolved in 100 ml of water containing 4.38 g of 98% sodium hydroxide is cooled with ice to maintain a temperature of about 0° C., and the above diazonium solution added thereto to bring the total volume to about 400 ml. The product solidifies over night and is readily filterable. The λ max. in acetone is at 405 nm. and the product is 4'-[(2''-carbomethoxyphenyl)azo]-5'-methyl-2'-methoxy-4-hydroxy-azo-benzene.

EXAMPLE 3

A 4.00 g portion of the product of Example 2 is added to a solution of 10 ml of ethanolamine and 5 ml of isopropanol. The solution is heated by steam for 40 minutes and poured into a solution of 10 ml of acetic acid in 30 ml of water and the product was removed by filtration. Recrystallization is from hot, dilute isopropanol to remove some unreacted material. The λ max. in acetone is at 418 nm. The product is the disperse dye 4'-[(2''-N-hydroxyethylcarbamylphenyl)-azo]-5'-methyl-2'-methoxy-4-hydroxy-azo-benzene.

EXAMPLE 4

The product of Example 3 is sulfated in concentrated sulfuric acid, using 2.00 g of intermediate for 10 ml of sulfuric acid, and using a bath of ice water to prevent overheating. The solution is added to about 35 g of ice and the precipitate removed by filtration, slurried in cold water, and refiltered. The wet precipitate is treated with dilute sodium hydroxide solution until soluble, then with acetic acid until reprecipitated at about pH 6. The product is removed by filtration and dried at 60° C. The product is 4'-[(2''-N-sulfatoethyl-carbamylphenyl-)azo]-5'-methyl-2'-methoxy-4-hydroxy-azobenzene, Na salt. The λ max. in aqueous acetone is at 522 nm. and the acid dye is yellow-orange with good properties on nylon 6 tricot fabric and nylon 6.6 carpet.

EXAMPLE 5

Approximately one gram of the product of Example 3 is treated in basic solution (25 ml) with about five grams of diethyl sulfate at 80°–90° C. The basic solution is made from 5 g of soldium bicarbonate in 100 ml of water, with sufficient 25% sodium hydroxide solution to increase the pH to about 11. The diethyl sulfate is added dropwise during about two hours, along with sufficient 25% sodium hydroxide solution to maintain the pH at 11. The product is recovered by filtration after dilution of the reaction system with water and cooling with ice. The product consists of the disperse dye 4'-[(2''-N-hydroxyethylcarbamyl-phenyl)azo]-2'-methyl-2'-methoxy-4-ethoxy-azobenzene, having λ max. in acetone at 408 mm.

EXAMPLE 6

About one-third gram of the product of Example 5 is dissolved in just enough concentrated sulfuric acid (2–3 ml) to dissolve it readily at room temperature. The solution is added to sufficient ice to keep the temperature below 20° C. as the solution is made basic with sodium hydroxide solution. The product is removed by filtration and washed with 15% sodium sulfate solution. The product is the acid dye 4'[(2''-N-sulfoethylcarbamylphenyl)azo]-5'-methyl-2'-methoxy-4-ethoxy-azobenzene, Na salt having a λ max. at 413 nm and thus imparting to nylon fibers an orange shade less reddish than the dye of Example 4. The dye exhibits good properties such as lightfastness on both nylon 6 tricot fabric and nylon 6.6 carpet and shows good exhaustion, build, and migration on nylon carpet.

Additional examples illustrating the compounds of the present invention are given in the table below. In Examples 7–56, the acid group CO—X—Z—OSO$_3$M is located at position 2''.

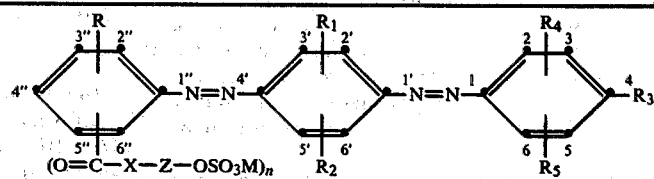

| Ex. No. | —X—Z— | M | R | R$_1$ | R$_2$ |
|---|---|---|---|---|---|
| 7 | —OC$_2$H$_4$OC$_2$H$_4$— | Na | H | H | H |
| 8 | —NHCH$_2$CH$_2$— | Na | H | H | H |
| 9 | —NHCH$_2$CH$_2$— | Na | H | H | H |
| 10 | —NHCH$_2$CH$_2$— | Na | H | H | H |
| 11 | —NHCH$_2$CH$_2$— | K | H | H | H |
| 12 | —NHCH$_2$CH$_2$— | K | H | 3'-CH$_3$ | 5'-CH$_3$ |
| 13 | —NHCH$_2$CH$_2$— | Na | H | H | H |
| 14 | —N(CH$_3$)CH$_2$CH$_2$— | Na | 4''-Br | H | H |
| 15 | —OCH$_2$CH$_2$— | Na | H | H | H |
| 16 | —NHC$_2$H$_4$OC$_2$H$_4$— | Na | 4''-Cl | H | H |
| 17 | —NHCH$_2$CH$_2$— | Na | H | H | 5'-NHCOCH$_3$ |
| 18 | —NHCH$_2$CH$_2$— | Na | H | H | 5'-NHCOCH$_3$ |
| 19 | —NHCH$_2$CH$_2$— | K | 4''-OH | 2'-Cl | H |
| 20 | —NHCH$_2$CH$_2$— | K | H | 2'-Cl | H |

-continued

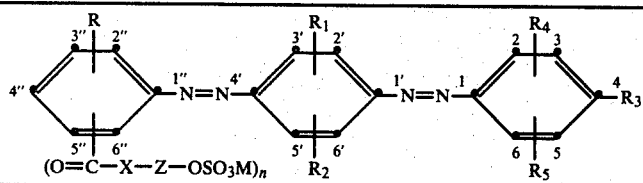

| | $(O=C-X-Z-OSO_3M)_n$ | M | R | $R_1$ | $R_2$ | $R_4$ $R_5$ | |
|---|---|---|---|---|---|---|---|
| 21 | —NHCH$_2$CH$_2$— | Na | H | | 3'-CH$_3$ | H |
| 22 | —NHCH$_2$CH$_2$— | Na | H | | 3'-CH$_3$ | H |
| 23 | —NHCH$_2$CH$_2$— | Na | H | | 3'-CH$_3$ | H |
| 24 | —NHCH$_2$CH$_2$— | Na | 6"-Br | | 3'-CH$_3$ | H |
| 25 | —NHCH$_2$CH$_2$— | Na | 6"-Br | | 3'-CH$_3$ | H |
| 26 | —NHCH$_2$CH$_2$— | Na | H | | 3'-CH$_3$ | H |
| 27 | —NHC$_2$H$_4$NHC$_2$H$_4$— | K | H | | 3'-CH$_3$ | H |
| 28 | —OC$_2$H$_4$OC$_2$H$_4$— | Na | H | | 3'-CH$_3$ | H |
| 29 | —OC$_2$H$_4$OC$_2$H$_4$— | Na | H | | H | H |
| 30 | —NHCH$_2$CH(CH$_3$)CH$_2$— | Na | H | | 3'-OCH$_3$ | H |
| 31 | —NHCH$_2$CH$_2$— | Na | H | | 3'-OCH$_3$ | H |
| 32 | —OCH$_2$CHClCH$_2$— | K | 5"-Br | | 3'-OCH$_3$ | H |
| 33 | —NHCH$_2$CH$_2$— | K | H | | 3'-OCH$_3$ | H |
| 34 | —OCH$_2$CH$_2$— | NH$_4$ | H | | 3'-OCH$_3$ | H |
| 35 | —NHCH$_2$CH$_2$— | Na | H | | 3'-OC$_2$H$_5$ | H |
| 36 | —NHCH$_2$CH$_2$— | Na | H | | 3'-NHCOCH$_3$ | H |
| 37 | —NHCH$_2$CH$_2$— | Na | 6"-Cl | | 2'-Br | 5'-Br |
| 38 | —NHCH$_2$CH$_2$— | Na | H | | 2'-CH$_3$ | 5'-CH$_3$ |
| 39 | —NHCH$_2$CH$_2$— | Na | H | | 2'-CH$_3$ | 5'-CH$_3$ |
| 40 | —NHCH$_2$CH$_2$— | Na | H | | 2'-CH$_3$ | 5'-CH$_3$ |
| 41 | —NHC$_2$H$_4$CONHC$_2$H$_4$OC$_2$H$_4$— | NH$_4$ | 4"-Br | | 2'-CH$_3$ | 5'-CH$_3$ |
| 42 | —NHCH$_2$CH$_2$— | Na | H | | 2'-CH$_3$ | 5'-CH$_3$ |
| 43 | —NHCH$_2$CH$_2$— | Na | H | | 2'-CH$_3$ | 5'-CH$_3$ |
| 44 | —NHCH$_2$CH$_2$— | Na | H | | 2'-CH$_3$ | 5'-CH$_3$ |
| 45 | —NHCH$_2$CH$_2$CH$_2$— | Na | H | | 2'-CH$_3$ | 5'-CH$_3$ |
| 46 | —NHCH$_2$CH$_2$CH$_2$— | Na | H | | 2'-CH$_3$ | 5'-CH$_3$ |
| 47 | —NHCH$_2$CH$_2$— | Na | H | | 2'-CH$_3$ | 5'-CH$_3$ |
| 48 | —NHCH$_2$CH$_2$— | Na | H | | 2'-CH$_3$ | 5'-OCH$_3$ |
| 49 | —OCH$_2$CH$_2$— | NH$_4$ | H | | 2'-CH$_3$ | 5'-OCH$_3$ |
| 50 | —NHCH$_2$CH$_2$— | K | H | | 2'-CH$_3$ | 5'-OCH$_3$ |
| 51 | —NHCH$_2$CH$_2$— | K | H | | 2'-CH$_3$ | 5'-NHCOCH$_3$ |
| 52 | —NHCH$_2$CH$_2$— | Na | H | | 2'-CH$_3$ | 5'-NHCOCH$_3$ |
| 53 | —NHCH$_2$CH$_2$— | Na | H | | 2'-OCH$_3$ | 5'-OCH$_3$ |
| 54 | —NHCH$_2$CH$_2$— | Na | H | | 2'-OCH$_3$ | 5'-OCH$_3$ |
| 55 | —OCH$_2$C(CH$_3$)$_2$CH$_2$— | Na | H | | 2'-OCH$_3$ | 5'-OCH$_3$ |
| 56 | —NHCH$_2$C(CH$_3$)$_2$CH$_2$— | NH$_4$ | H | | 2'-OCH$_3$ | 5'-OCH$_3$ |
| 57 | —NHCH$_2$CHCl | Na | H | | H | H |
| 58 | —NHCH$_2$CHCl | Na | H | | H | 5'-C$_2$H$_4$CN |
| 59 | —NHCH$_2$CHCl | K | H | | H | H |
| 60 | —NHCH$_2$CHCl | K | H | | 3'-OH | 5'-OH |
| 61 | —OCH$_2$CH$_2$— | K | H | | 3'-CH$_2$C$_6$H$_5$ | H |
| 62 | —NHC$_2$H$_4$OC$_2$H$_4$— | K | 4"-Cl | | H | H |
| 63 | —NHCH(C$_6$H$_{11}$)CH$_2$— | K | H | | H | 5'-NHCOCH$_3$ |
| 64 | —NHCH$_2$CH$_2$— | K | 4"-OH | | 2'-Cl | H |
| 65 | —NHCH$_2$CH$_2$— | Na | H | | 3'-CH$_2$Cl | H |
| 66 | —NHCH$_2$CH$_2$— | Na | H | | 3'-CH$_2$Cl | 5'-OCH$_2$Br |
| 67 | —NHCH$_2$CH$_2$— | Na | H | | 3'-CH$_2$Cl | H |
| 68 | —NHCH$_2$CH$_2$— | Na | 6"-Br | | 3'-CH$_2$CN | H |
| 69 | —NHCH$_2$CH$_2$— | Na | 6"-Br | | 3'-CH$_3$ | H |
| 70 | —NHCH$_2$CH$_2$— | Na | H | | 3'-CH$_3$ | H |
| 71 | —NHC$_2$H$_4$NHC$_2$H$_4$— | K | 4"-C$_2$H$_5$ | | 3'-CH$_3$ | H |
| 72 | —OC$_2$H$_4$OC$_2$H$_4$— | Na | H | | 3'-CH$_2$OH | H |
| 73 | —OC$_2$H$_4$OC$_2$H$_4$— | Na | H | | H | H |
| 74 | —NHCH$_2$CH(CH$_3$)CH$_2$— | Na | H | | 3'-OCH$_3$ | H |
| 75 | —NHCHClCH$_2$— | Na | H | | 3'-OCH$_3$ | H |
| 76 | —NHCH$_2$CH$_2$— | Na | 5"-OCH$_3$ | | 3'-OCH$_3$ | H |
| 77 | —NHCH$_2$CH$_2$— | Na | H | | 2'-CH$_2$OC$_2$H$_5$ | 5'-CH$_3$ |
| 78 | —NHC$_2$H$_4$CONHC$_2$H$_4$OC$_2$H$_4$— | NH$_4$ | 4'-Br | | H | 5'-CH$_3$ |
| 79 | —NHCH(C$_6$H$_5$)CH$_2$— | K | H | | H | 5'-CH$_3$ |
| 80 | —NHCH$_2$CH$_2$— | K | H | | H | 5'-NHCOCH$_3$ |
| 81 | —NHCH$_2$CH$_2$— | Na | H | | H | 5'-NHCOCH$_3$ |
| 82 | —NHCH$_2$CH$_2$— | Na | H | | 2'-OCH$_3$ | 5'-OCH$_2$COOCH$_3$ |

| Ex. No. | $R_3$ | $R_4$ | $R_5$ |
|---|---|---|---|
| 7 | —OH | H | H |
| 8 | —OCH$_3$ | 5-CH$_3$ | H |
| 9 | —OC$_2$H$_5$ | 5-CH$_3$ | H |
| 10 | —OH | 2-CH$_3$ | H |
| 11 | —OH | 5-CH$_3$ | H |
| 12 | —OH | H | H |
| 13 | —OH | 3-CH$_3$ | H |
| 14 | —OH | 5-C$_2$H$_5$ | H |
| 15 | —OH | 2-CH$_3$ | H |

-continued

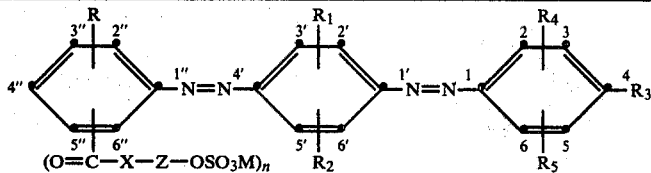

| | R | R₁ | R₄ |
|---|---|---|---|
| | (O=C-X-Z-OSO₃M)ₙ | R₂ | R₅ |
| 16 | —OH | H | 5-OH |
| 17 | —OH | H | H |
| 18 | —OC₂H₅ | H | H |
| 19 | —OH | H | H |
| 20 | —OH | 2-C₂H₅ | H |
| 21 | —OH | H | H |
| 22 | —OH | 2-Cl | H |
| 23 | —OC₂H₅ | 2-Cl | H |
| 24 | —OC₂H₅ | 2-OH | H |
| 25 | —OC₂H₅ | 3-CH₃ | H |
| 26 | H | 2-CH₃ | 6-OCH₃ |
| 27 | H | 2-OCH₃ | 5-CH₃ |
| 28 | —OC₂H₅ | 3-CH₃ | 5-CH₃ |
| 29 | —OH | 2-CH₃ | 6-CH₃ |
| 30 | —OH | 2-C₂H₅ | H |
| 31 | —OH | H | H |
| 32 | —OC₂H₅ | 2-CH₃ | H |
| 33 | —OC₂H₅ | 2-OCH₃ | H |
| 34 | —OC₂H₅ | 2-Cl | H |
| 35 | —OC₂H₅ | 2-CH₃ | 6-CH₃ |
| 36 | —OC₂H₅ | 2-CH₃ | H |
| 37 | —OC₂H₅ | H | H |
| 38 | —OCH₃ | H | H |
| 39 | —OCH₃ | 3-CH₃ | H |
| 40 | —OCH₃ | 2-CH₃ | H |
| 41 | —OCH₃ | 2-CH₃ | 6-CH₃ |
| 42 | —OCH₃ | 2-CH₃ | 5-CH₃ |
| 43 | —OCH₃ | 3-CH₃ | 5-CH₃ |
| 44 | —OH | 3-CH₃ | 5-CH₃ |
| 45 | —OH | 2-CH₃ | H |
| 46 | —OH | 2-CH₃ | 6-CH₃ |
| 47 | —OH | 2-CH₃ | 5-CH₃ |
| 48 | —OH | H | H |
| 49 | —OC₂H₅ | H | H |
| 50 | —OCH₃ | H | H |
| 51 | —OH | 2-CH₃ | 6-CH₃ |
| 52 | —OH | 2-CH₃ | 6-CH₃ |
| 53 | —OH | 5-CH₃ | H |
| 54 | —OH | 2-Cl | H |
| 55 | —OH | 2-CH₃ | 6-CH₃ |
| 56 | —OH | 3-CH₃ | 5-CH₃ |
| 57 | —OCH₂Cl | 5-CH₃ | H |
| 58 | —OC₂H₅ | 5-CH₃ | H |
| 59 | —OH | 5-CH₂Cl | H |
| 60 | —OH | H | H |
| 61 | —OH | 2-CH₃ | H |
| 62 | —OH | H | 5-OH |
| 63 | —OH | H | H |
| 64 | —OH | H | 5-C₂H₄OCOCH₃ |
| 65 | —OH | H | H |
| 66 | —OH | 2-Cl | H |
| 67 | —OC₂H₄C₆H₁₁ | 2-Cl | H |
| 68 | —OC₂H₄C₆H₁₁ | 2-OH | H |
| 69 | —OC₂H₄C₆H₁₁ | 3-CH₃ | H |
| 70 | H | 2-OCH₃ | 6-CH₂Cl |
| 71 | H | 2-OCH₃ | 5-CH₃ |
| 72 | —OC₂H₅ | 3-CH₃ | 5-CH₃ |
| 73 | —OH | 2-CH₂CN | 6-CH₃ |
| 74 | —OH | 2-C₂H₄OC₂H₅ | H |
| 75 | —OH | H | H |
| 76 | —OH | 2-OCH₃ | H |
| 77 | —OCH₃ | H | H |
| 78 | —OC₂H₄OCH₃ | H | 6-CH₃ |
| 79 | —OCH₃ | H | H |
| 80 | —OH | 2-C₂H₄OCH₃ | 6-CH₃ |
| 81 | —OH | 2-C₂H₄OC₂H₅ | 6-CH₃ |
| 82 | —OH | 5-CH₃ | H |

In Examples 83-88, the acid group is located at position 3":

| | | | | | | | | |
|---|---|---|---|---|---|---|---|---|
| 83 | —OC₂H₄OC₂H₄— | K | H | H | H | —OH | H | H |
| 84 | —NHCH₂CH₂— | Na | H | H | H | —OH | 3-C₂H₅ | H |
| 85 | —NHCH₂CH₂— | Na | H | H | 5'-NHCOCH₃ | —OC₂H₅ | H | H |
| 86 | —NHCH₂CH₂— | Na | H | 3'-CH₃ | H | —OH | H | H |
| 87 | —NHCH₂CH₂— | Na | 4"-Cl | 3'-OCH₃ | H | —OC₂H₅ | H | H |
| 88 | —NHCH₂CH₂— | Na | H | 2'-OCH₃ | 5'-OCH₃ | —OH | 5-CH₃ | H |

In Examples 89–96, the acid group is located at position 4":

| | | | | | | | | |
|---|---|---|---|---|---|---|---|---|
| 89 | —NHCH₂CH₂— | K | 2"-Br | 2'-CH₃ | 5'-CH₃ | —OC₂H₅ | H | H |
| 90 | —NHCH₂CH₂— | Na | H | 2'-CH₃ | 5'-CH₃ | —OC₂H₅ | 2-Cl | H |
| 91 | —NHCH₂CH₂— | Na | H | 2'-CH₃ | 5'-CH₃ | —OC₂H₅ | 3-CH₃ | 5-CH₃ |
| 92 | —OCH₂CH₂— | Na | H | 2'-Br | 5'-Br | —OH | H | H |
| 93 | —NHCH₂CH₂CH₂— | NH₄ | 3"-Br | 3'-OCH₃ | H | —OH | 2-CH₃ | 5-CH₃ |
| 94 | —OCH₂CH(OSO₃Na)CH₂— | Na | H | 3'-OCH₃ | H | —OH | 3-CH₃ | 5-CH₃ |
| 95 | —NHCH₂CH₂— | Na | H | 2'-OCH₃ | 5'-CH₃ | —OCH₃ | H | H |
| 96 | —NHC₂H₄OC₂H₄— | K | H | 2'-OCH₃ | 5'-CH₃ | —OC₂H₅ | H | H |

In Examples 97–101, n=2, and the acid groups are located at positions 2" and 3":

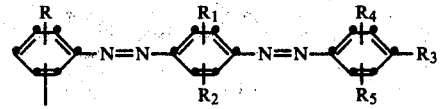

| | | | | | | | | |
|---|---|---|---|---|---|---|---|---|
| 97 | —NHCH₂CH₂— | Na | H | 2'-OCH₃ | 5'-CH₃ | —OH | H | H |
| 98 | —NHCH₂CH₂— | Na | H | 2'-OCH₃ | 5'-CH₃ | —OCH(CH₃)₂ | H | H |
| 99 | —NHCH₂CH₂— | Na | H | 3'-CH₃ | H | —OH | H | H |
| 100 | —NHCH₂CH₂CH₂— | Na | H | 3'-CH₃ | H | —OCH₃ | 2-CH₃ | H |
| 101 | —OCH₂CH₂— | Na | H | 2'-CH₃ | 5'-CH₃ | —OC₂H₅ | H | H |

In Examples 102–106, n=2, and the acid groups are located at positions 3" and 5":

| | | | | | | | | |
|---|---|---|---|---|---|---|---|---|
| 102 | —NHCH₂CH₂— | Na | H | H | H | —OH | H | H |
| 103 | —NHCH₂CH₂— | Na | H | H | H | —OC₂H₅ | H | H |
| 104 | —NHCH₂CH₂— | K | H | 3'-CH₃ | H | —OH | H | H |
| 105 | —NHCH₂CH₂— | NH₄ | H | 3'-CH₃ | H | —OC₂H₅ | H | H |
| 106 | —OC₂H₄OC₂H₄— | Na | H | 3'-OCH₃ | H | —OCH₃ | 5-CH₃ | H |

In Examples 107–122, n=1, and the acid groups are located at position 2".

| | | | | | | | | |
|---|---|---|---|---|---|---|---|---|
| 107 | —OC₂H₄OC₂H₄ | Na | H | H | H | —NH₂ | H | H |
| 108 | —NHCH₂CH₂— | Na | H | H | H | —NHC₂H₅ | 2-CH₃ | H |
| 109 | —NHCH₂CH₂— | Na | H | H | H | —N(C₂H₅)₂ | 2-CH₃ | H |
| 110 | —NHCH₂CH₂— | Na | H | H | H | —NHC₂H₄OH | 2-CH₃ | H |
| 111 | —NHCH₂CH₂— | K | H | H | H | —N(CH₂CH₂Cl)₂ | 2-CH₃ | H |
| 112 | —NHCH₂CH₂— | K | H | 3'-OH | 5'-OH | —NHCH₂CH₂C₆H₅ | OCH₃ | H |
| 113 | —NHCH₂CH₂— | Na | H | H | H | —N(C₂H₅)₂ | NHCOCH₃ | H |
| 114 | —N(CH₃)CH₂CH₂— | Na | 4"-Br | H | H | —N(C₂H₅)₂ | Cl | H |
| 115 | —OCH₂CH₂— | Na | H | H | H | —N(C₂H₅)₂ | 2-CH₃ | 5-CH₃ |
| 116 | —NHC₂H₄OC₂H₄— | Na | 4"-Cl | H | H | —N(C₂H₅)₂ | 2-C₂H₅ | 5-CH₃ |
| 117 | —NHCH₂CH₂— | Na | H | H | 5'-NHCOCH₃ | —N(C₂H₅)₂ | 2-Cl | 5-CH₃ |
| 118 | —NHCH₂CH₂— | Na | H | H | 5'-NHCOCH₃ | —N(C₂H₅)₂ | 2-CH₃ | 5-OCH₃ |
| 119 | —NHCH₂CH₂ | K | 4"-OH | 2'-Cl | H | —N(C₂H₅)₂ | 2-NHCOCH₃ | 5-CH₃ |
| 120 | —NHCH₂CH₂— | K | H | 2'-Cl | H | —NHC₂H₅ | 2-NHCOCH₃ | 5-CH₃ |
| 121 | —NHCH₂CH₂— | Na | H | 3'-CH₃ | H | —NHC₄H₉—n | 2-CH₃ | 5-OCH₃ |
| 122 | —NHCH₂CH₂— | Na | H | 3'-CH₃ | H | —NHCH₃ | 2-NHCOCH₃ | 5-CH₃ |

The invention has been described in detail with particular reference to preferred embodiments thereof, but it will be understood that variations and modifications can be effected within the spirit and scope of the invention.

We claim:
1. A dye of the formula:

wherein X is —O—, —NH—, —N(alkyl)—, or —N-(aryl)—; Z is selected from straight or branched-chain alkylene, —C₂H₄—O—C₂H₄—, —C₂H₄CONHC₂H₄OC₂H₄—, and —C₂H₄NHC₂H₄—; M is H, Na, K or NH₄; n is 1 or 2; $R_3$ is —OH, alkoxy or —NR₈R₉ wherein $R_8$ and $R_9$ are independently selected from H and alkyl and when either $R_4$ or $R_5$ is hydroxy or alkoxy ortho to the azo radical, $R_3$ is further selected from hydrogen, halogen, alkyl, and aryl; R, $R_1$, $R_2$, $R_4$, and $R_5$ are the same or different groups selected from hydrogen, halogen, hydroxyl, alkyl, aryl, alkoxy and alkanoylamino; with the proviso that when $R_3$ is neither —OH, alkoxy, nor —NR$_8$R$_9$, one of R$_4$ and R$_5$ is either hydroxy or alkoxy ortho to the azo radical; and wherein these alkyl, alkylene, alkoxy and aryl moieties are unsubstituted or substituted with one to three substituents selected from hydroxy, halogen, cyano, succinimido, cyclohexyl, alkyl-sulfonyl, alkylthio, alkanoyl, alkanoyloxy, amino, alkylamino, dialkylamino, arylamino, furyl, alkoxy, phenoxy, alkanoylamino, sulfamoyl, alkylsulfamoyl, dialkylsulfamoyl, phenyl and phenyl substituted with alkyl, alkoxy, halogen, alkanoylamino, cyano or alkoxycarbonyl, —COOR$^6$ wherein R$^6$ is selected from alkyl and alkyl substituted with halogen, hydroxy, phenoxy, aryl, cyano, cycloalkyl, alkylsulfonyl, alkylthio, alkanoyloxy or alkoxy, and OCOR$^7$ wherein R$^7$ is alkyl.

2. The dye according to claim 1 of the formula:

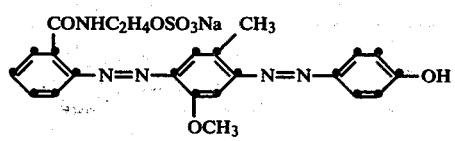

3. The dye according to claim 1 of the formula:

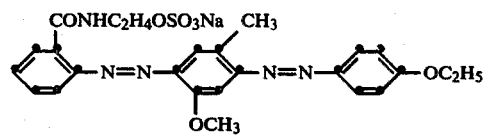

4. The dye according to claim 1 of the formula:

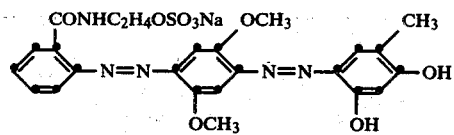

5. The dye according to claim 1 of the formula:

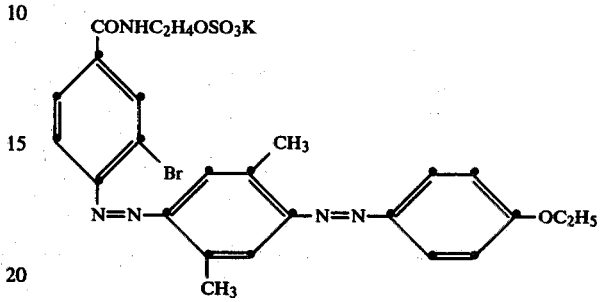

6. The dye according to claim 1 of the formula:

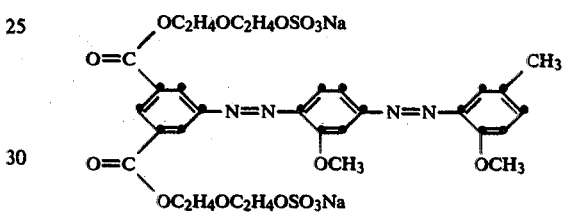

* * * * *